United States Patent [19]

Tachibana et al.

[11] Patent Number: 4,788,482
[45] Date of Patent: Nov. 29, 1988

[54] POSITION CORRECTING CONTROL SYSTEM FOR SERVOMECHANISM DEVICE

[75] Inventors: Kyozo Tachibana; Toshihiko Sakai; Hisaaki Hirabayashi, all of Yokohama; Koichi Sugimoto, Hiratsuka; Hiroshi Sugai, Sakura; Hisakazu Ninomiya, Funabashi, all of Japan

[73] Assignee: Hitachi, Ltd., Tokyo, Japan

[21] Appl. No.: 75,987

[22] Filed: Jul. 21, 1987

[30] Foreign Application Priority Data

Jul. 22, 1986 [JP] Japan ................ 61-170852

[51] Int. Cl.⁴ .................................. G05B 5/01
[52] U.S. Cl. ..................... 318/616; 318/611;
 318/685; 901/9; 901/15; 901/19
[58] Field of Search ............ 318/567, 568, 569, 599,
 318/600, 601, 611, 616, 561, 685; 364/174, 513,
 183, 193; 901/9, 22, 30, 34, 15, 50

[56] References Cited

U.S. PATENT DOCUMENTS

| 4,426,608 | 1/1984 | Larson et al. | 318/685 |
| 4,547,858 | 10/1985 | Horak | 364/193 |
| 4,609,855 | 9/1986 | Andrews | 364/151 |
| 4,727,303 | 2/1988 | Morse et al. | 318/616 |

Primary Examiner—William M. Shoop, Jr.
Assistant Examiner—Brian K. Young
Attorney, Agent, or Firm—Antonelli, Terrry & Wands

[57] ABSTRACT

The present invention relates to a control system for a servomechanism device such as robot, and more particularly to a position correcting control system for a servomechanism device which is well suited to perform high-precision positioning or high-perfomance operations on the basis of a sensor feedback control system such as force detection feedback control. It is characterized in that a plurality of algorithms for correcting a position target value on the basis of a sensor signal are prepared and are switchedly used so as to readily switch functions, depending upon whether the purpose of a sensor control is a high-precision control or any other high-performance control, that the position target value is corrected through a threshold characteristic element or a dead band element so as to make effective the correction of the position target value based on the sensor signal, and that a correcting signal is applied through a response lag element so as to attain stabilization owing to a viscous effect bestowed on the position correcting operation based on the sensor signal.

9 Claims, 2 Drawing Sheets ated for fingers (these quantities are indicated by a vactor in algebra, and a crown bar shall mean a vector hereinbelow). Numeral 12 designates a position detection element for detecting and feeding back the position and attitude (hereinbelow, the attitude shall be also regarded as a rotational position, and they shall be merely called the "position" comprehensively) $\bar{x}_{out}$, and it delivers a feedback, signal $\bar{x}_f$ as an output. Numeral 13 designates an addition element which compares the feedback signal $\bar{x}_f$ with a position target value $\bar{x}_{in}$ and which delivers an error $\bar{e}$ and sends it to the position control element 11. In a case where the device is an articular type robot as shown in FIG. 3, a computation for the transformation between a polar coordinate expression around the rotary shaft of a motor, a joint or the like and a rectangular coordinate expression for representing a position in a space is involved, and the coordinate transformation computation is contained in

POSITION CORRECTING CONTROL SYSTEM FOR SERVOMECHANISM DEVICE

BACKGROUND OF THE INVENTION

The present invention relates to a control system for a servomechanism device such as robot. More particularly, it relates to a position correcting control system for a servomechanism device which is well suited to perform high-precision positioning or high-performance operations on the basis of a sensor feedback control system such as force detection feedback control.

FIG. 3 shows an industrial robot which is an example of a servomechanism device. This robot 1 has, e.g., six degrees of freedom and exerts an action on an object to-be-handled (not shown) by means of a hand 2. A controller 3 receives the reference values of positions and forces and feeds back position signals and force signals, thereby to deliver manipulated variables. The manipulated variables are applied to the motors of corresponding joints, and the position of the acting point of the hand 2 is controlled so as to coincide with the reference value thereof. In general, such a device is directly controlled by the rotational positions of motor shafts, and distances from the motor shafts to the acting point of fingers are found through correcting calculations based on the specifications of the mechanism. Since, however, the specifications of the mechanism fluctuate greatly, the control precisions of the position and attitude of the fingers are not very high. Therefore, the position and attitude of the fingers are detected only within a limited range by another sensor, for example, a six-axis force sensor 4, thereby to intend a precise feedback control.

Statements on the sensor feedback control of this type are contained in 'Journal of the Japan Society of Precision Engineering', Vol. 51, No. 11, pp. 40–45 and pp. 46–52; 'Journal of the Society of Instrument and Control Engineering', Vol. 25, No. 1, pp. 77–80 and pp. 45–50; and 'Preliminary Abstracts of the 27th Japan Joint Automatic Control Conference', pp. 241–244. In these literatures, however, a method of constructing a control system and practicable methods of correcting a position and an attitude, as well as the quantitative evaluation of the effects thereof are not described in detail, Such descriptions lack information for, accurate designing of various items of the whole system. Moreover, as regards the control employing the force sensor, control purposes differ significantly. It would be desirable that a position error is detected on the basis of a force which is used it for the feedback control; a pressing control under a predetermined force may be utilized and a force may be detected which causes bending of the fingers backwards by a distance corresponding to the magnitude of the force.

SUMMARY OF THE INVENTION

An object of the present invention is to provide a novel and practicable position correcting control system for a servomechanism which can be used in common for the different control purposes mentioned above.

In order to accomplish the object, the present invention consists in that a plurality of algorithms for correcting a position target value on the basis of a sensor signal are prepared and are switchedly used so as to readily switch functions, depending upon whether the purpose of a sensor control is a high-precision control or any other high-performance control, that the position target value is corrected through a threshold characteristic element or a dead band element so as to make effective the correction of the position target value based on the sensor signal, and that a correcting signal is applied through a response lag element so as to attain stabilization owing to a viscous effect bestowed on the position correcting operation based on the sensor signal.

DESCRIPTION OF THE PREFERRED EMBODIMENTS

In view of the fact that, in general, the control of a servomechanism device consists basically in a position control, in which the position or state of the acting point of the device is detected by a sensor with the intention of performing a control complying with a control purpose at high precision or at will, the present invention is so constructed that a position target value is corrected by the use of a sensor signal. That is, the present invention bases the position control on a motor shaft and adopts a method in which the position target value to be applied to the motor shaft is corrected by the sensor. Therefore, an adjustment on a control suited to the specifications of the whole system is permitted, and a performance meeting the purpose of the optimalizing control can be realized. Moreover, even for a different control purpose, the present system does not destroy the base of the position control and can therefore be used in common, and it is merely required that an algorithm for the correction with the sensor signal be partly switched according to the purpose.

Now, an embodiment of the present invention will be described with reference to FIGS. 1 and 2.

Figure 1:
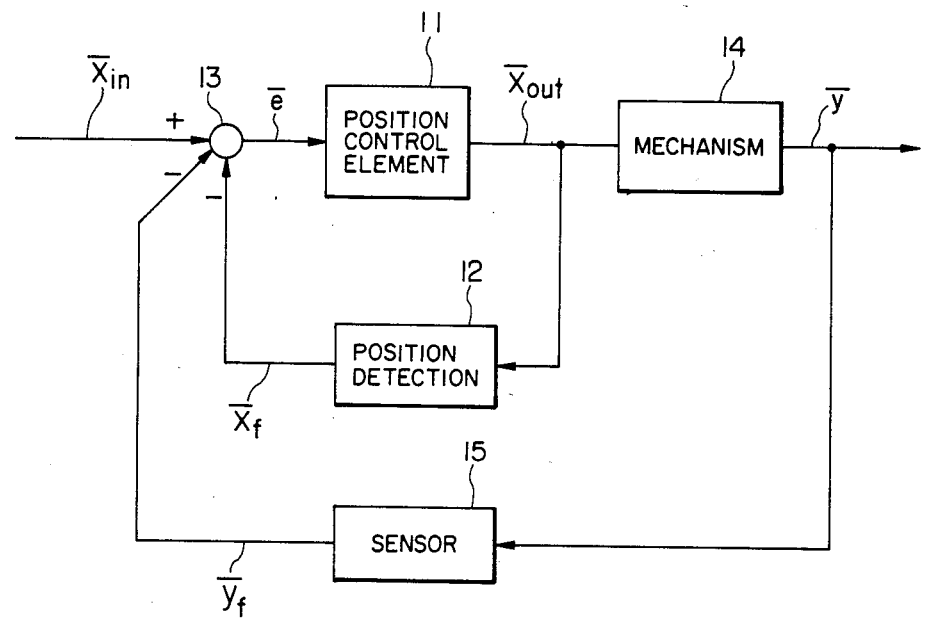
FIG. 1 is a block diagram showing an embodiment of a control system according to the present invention.

FIG. 1 is a control loop block diagram of a position correcting control system according to one embodiment of the present invention. In FIG. 1, numeral 11 designates a position control element from a controller 3 (refer to FIG. 3) to a driver such as motor or actuator, and symbol $\bar{x}_{out}$ denotes a position and an attitude calcuthe transfer characteristics of the position control element 11 and the position detection element 12. Shown at numeral 14 is a mechanism, which produces the position $\bar{y}$ of an actual acting point. Numeral 15 indicates a vernier detector as a sensor which detects the acting point position $\bar{y}$ at high precision, but only within a partial spacial range, and which generates a signal $\bar{y}_f$ by converting the position $\bar{y}$ into the output whose content differs depending upon a control purpose. The output signal $\bar{y}_f$ is applied to the addition element 13 as a negative feedback signal, so as to correct the position target $\bar{x}_{in}$.

Figure 3:
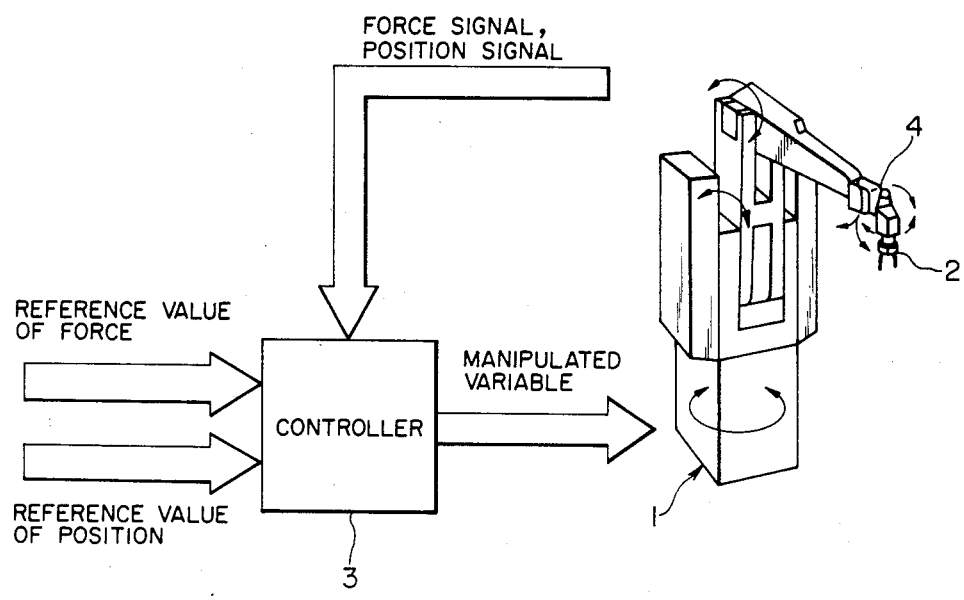
FIG. 3 is a schematic arrangement diagram for explaining an industrial robot which is an example of a servomechanism.

In this embodiment, the vernier detector 15 is used as the force sensor 4 in FIG. 3. Actions for several different control purposes will be explained below.

First, in a case where the force sensor 15 for fingers detects the position error between the fingers and an object to-be-handled and where the feedback control is performed so as to correct the position error, the relationship between the magnitude of a force and that of the position error should desirably be definite. Besides, a loop formed of the elements 13-11-14-15-13 must be stable with respect to gain and phase characteristics and must satisfy a precision and a responsiveness as desired. Especially in this case, the purpose is a high-precision position control. It is therefore more desirable to incorporate an element having an integral characteristic in the aforementioned loop.

Next, in a case where a pressing control is performed under a predetermined force, the vernier detector 15 needs to generate the output $\bar{y}_f$ in excess of a target force so as to reduce the position target value $\bar{x}_{in}$. For this purpose, it is more desirable to set the characteristic of the vernier detector 15 as illustrated in FIG. 2. This characteristic is such that an output value $|\bar{y}_f|$ versus the magnitude of a force is generated at and above a threshold value $F_o$. Thus, when at least the threshold value $F_o$ has been reached, the position target is automatically corrected, with the result that the control of nearly constant force can be realized. In this case, if the position target value $\bar{x}_{in}$ of the input is changed, a position control corresponding thereto can be performed under the constant force state. Also, it is more desirable that the threshold value $F_o$ can be changed according to the intended uses of the servomechanism devices.

Further, in case of performing a so-called compliance control wherein when a force is externally exerted on fingers, these fingers are pushed back in the direction of the force and by a distance corresponding to the magnitude of the force, a correction position $\Delta \bar{x}$ needs to be set at a characteristic having an elastic modulus K with respect to the force $\bar{F}$. Besides, it is more desirable to endow the position correction with a viscous drag characteristic. Letting R denote a viscous drag coefficient, the characteristic of the following equation (1) should desirably be established for this purpose:

$$\Delta \bar{x} \cdot K + R \frac{d}{dt} \Delta \bar{x} = \bar{F} \quad (1)$$

This equation (1) is put into a Laplace transform form whose initial value is zero, and the form is reduced. Then, the following equation (2) is obtained:

$$\Delta \bar{X}(s) = \frac{1}{K} \cdot \frac{1}{1 + \frac{R}{K}s} \bar{F}(s) \quad (2)$$

This equation (2) becomes the correction of a first-order lag characteristic having a gain of 1/K and a time constant of R/K versus the external force $\bar{F}$.

Meanwhile, in case of a purpose according to which an object of inertia M is moved equivalently to a movement with a viscous drag coefficient R when subjected to an external force $\bar{F}$, a correcting control expressed by the following characteristic is performed:

$$M \frac{d^2}{dt^2} \Delta \bar{x} + R \frac{d}{dt} \Delta \bar{x} = \bar{F} \quad (3)$$

When this equation (3) is Laplace-transformed with an initial value 0 and then reduced, the following equation (4) is obtained:

$$\Delta \bar{X}(s) = \frac{1}{R} \cdot \frac{1}{s\left(1 + \frac{M}{R}s\right)} \bar{F}(s) \quad (4)$$

This equation (4) becomes the correction of a characteristic obtained by connecting in cascade a first-order lag element of gain constant 1/R and time constant M/R and an integral element, versus the external force $\bar{F}$.

As described above, in the present embodiment, the basic position control within the full bounds of the movable range of the servomechanism device is performed in accordance with the position target value, while the high-precision position control is performed at or near the acting point of this device on the object. Moreover, since the mechanism portion is included in the controlled object, the construction of the whole control system becomes definite, and the optimal characteristic adjustment conforming with a control theory is permitted.

When, in addition to the construction of the present embodiment, the algorithm of the feedback from the vernier detector is switched in accordance with the purpose of the position correcting control employing the vernier detector, a function suited to the purpose can be obtained with ease. Especially when such feedback algorithms are formed by the software of a computer, the switching becomes still easier.

Figure 2:
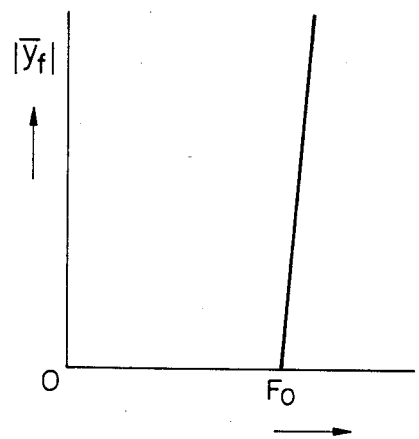
FIG. 2 is a graph showing the threshold characteristic of a vernier detector.

Besides, the output signal of the vernier detector is set at the threshold characteristic in FIG. 2, thereby to produce the effect that the constant force control can be readily realized.

Further, as indicated by Eq. (2) or Eq. (4), the element having the response lag characteristic is incorporated in the signal transfer path for the position target value correction from the vernier detector, thereby to produce the effect that a motion control equivalent to a particle kinematic system in an environment having an accurate compliance characteristic and viscous drag can be realized.

According to the present invention, there are the effects that the motion control of the acting point of a servomechanism device can be performed precisely and that control purposes can be changed and realized at will.

What is claimed is:

1. A position correcting control system for a servomechanism device having position detection means for detecting a position within full bounds of a movable range, said system further comprising:
   means for changing a position of an acting point in accordance with a position target value;

sensor means for detecting a state quantity at high precision within a partial range, said state quantity being an end-most quantity in controlling said position of an acting point;

means using an output signal of said position detection means as a position feedback variable; and means using an output signal of said sensor means for a correction of the position target value.

2. A position correcting control system for a servomechanism device as defined in claim 1, wherein said sensor means has a function capable of switching a plurality of different detection objects such as a high-precision position and a force, and an algorithm for the position target value correction can be altered as a control purpose at an initial position is changed to a different purpose such as of the high-precision position or force of the acting point.

3. A position correcting control system for a servomechanism device as defined in claim 1, wherein said sensor means has a threshold characteristic and is operated to reduce the output signal thereof from the position target value.

4. A position correcting control system for a servomechanism device as defined in claim 1, wherein an element having a response lag characteristic is incorporated in a correcting signal transfer path extending from said sensor means.

5. A position correcting control system for a servomechanism device as defined in claim 1, wherein said sensor means is a vernier detector.

6. In a servomechanism device having position detection means for detecting a position within full bounds of a movable range, and a sensor which detects a state quantity within a partial range at high precision, a position of an acting point being changed in accordance with a position target value; said sensor having a function capable of switching a plurality of different detection objects such as a high-precision position and a force, and an algorithm for the position target value correction can be altered as a control purpose at an initial position is changed to a different purpose such as of the high-precision position or force of the acting point; a position correcting control system for a servomechanism device characterized by using an output signal of said position detection means as a position feedback variable, and using an output signal of said sensor for a correction of the position target value.

7. In a servomechanism device having position detection means for detecting a position within full bounds of a movable range, and a sensor which detects a state quantity within a partial range at high precision, a position of an acting point being changed in accordance with a position target value; said sensor having a threshold characteristic and being operated to reduce the output signal thereof from the position target value; a position correcting control system for a servomechanism device characterized by using an output signal of said position detection means as a position feedback variable, and using an output signal of said sensor for a correction of the position target value.

8. In a servomechanism device having position detection means for detecting a position within full bounds of a movable range, and a sensor which detects a state quantity within a partial range at high precision, a position of an acting point being changed in accordance with a position target value; a signal transfer path extending from said sensor means, and an element having a response lag characteristic that is incorporated in said correcting signal transfer path; a position correcting control system for a servomechanism device characterized by using an output signal of said position detection means as a position feedback variable, and using an output signal of said sensor for a correction of the position target value.

9. In a servomechanism device having position detection means for detecting a position within full bounds of a movable range, and a sensor which is a vernier detector and detects a state quantity within a partial range at high precision, a position of an acting point being changed in accordance with a position target value; a position correcting control system for a servomechanism device characterized by using an output signal of said position detection means as a position feedback variable, and using an output signal of said sensor for a correction of the position target value.

* * * * *